(12) United States Patent
Noll

(10) Patent No.: US 9,676,394 B2
(45) Date of Patent: Jun. 13, 2017

(54) ROAD PAVER WITH OPERATING MODULE AND PROCESS TO ACTIVATE AN OPERATING FUNCTION

(71) Applicant: JOSEPH VOEGELE AG, Ludwigshafen/Rhein (DE)

(72) Inventor: Tobias Noll, Roschbach (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/868,622

(22) Filed: Sep. 29, 2015

(65) Prior Publication Data
US 2016/0090102 A1 Mar. 31, 2016

(30) Foreign Application Priority Data
Sep. 29, 2014 (EP) .................................... 14186847

(51) Int. Cl.
*E01C 19/48* (2006.01)
*B60W 50/08* (2012.01)
(Continued)

(52) U.S. Cl.
CPC ............ *B60W 50/08* (2013.01); *B60K 28/04* (2013.01); *E01C 19/4853* (2013.01); *F16P 3/14* (2013.01);
(Continued)

(58) Field of Classification Search
CPC ........ E01C 19/00; E01C 19/48; B60W 50/08; B60W 2540/00
(Continued)

(56) References Cited

U.S. PATENT DOCUMENTS 5,219,413 A 6/1993 Lineberger
7,159,684 B2 * 1/2007 Dahl ...................... B60K 28/04
180/271
(Continued)

FOREIGN PATENT DOCUMENTS

DE 112007000450 T5 1/2009
DE 102008063611 A1 6/2009
(Continued)

OTHER PUBLICATIONS

Japanese Office Action Dated Oct. 25, 2016, Application No. 2015-190025, Applicant GOTO, Masaki, 6 Pages.
(Continued)

*Primary Examiner* — Gary Hartmann
(74) *Attorney, Agent, or Firm* — Brooks Kushman P.C.

(57) ABSTRACT

A road paver with at least one operating module to enter operating commands. The operating module comprises a plurality of buttons that can each be pressed in a contact-based way to enter the respective operating commands in order to activate relevant operating functions of the road paver. According to the disclosure, the road paver further comprises a sensor unit that is designed to detect a distance of an operator to the operating module, whereby this distance determines a space from the operating module to any body part of the operator. The sensor unit is connected to a control unit of the road paver that is configured to already activate at least one of the operating functions of the road paver by means of the output signal as soon as the operator undercuts a predetermined threshold distance in relation to the operating module.

20 Claims, 4 Drawing Sheets

(51) Int. Cl.
*B60K 28/04* (2006.01)
*F16P 3/14* (2006.01)

(52) U.S. Cl.
CPC .... *B60W 2540/00* (2013.01); *B60Y 2200/414* (2013.01); *E01C 2301/30* (2013.01)

(58) Field of Classification Search
USPC .............................................. 404/84.05, 84.1
See application file for complete search history.

(56) References Cited

U.S. PATENT DOCUMENTS

| | | | | | |
|---|---|---|---|---|---|
| 7,196,629 | B2 * | 3/2007 | Ruoss | ................... | A61B 5/0507 280/734 |
| 7,283,903 | B2 * | 10/2007 | Merten | ................... | E02F 9/166 172/4.5 |
| 7,899,597 | B2 * | 3/2011 | Vitale | ................... | B60K 28/04 180/272 |
| 8,195,344 | B2 * | 6/2012 | Song | ................... | G08C 17/00 701/2 |
| 8,459,396 | B2 * | 6/2013 | Oettinger | ................... | F16P 3/14 180/272 |
| 8,517,628 | B2 * | 8/2013 | Weiser | ................... | E01C 19/48 404/84.05 |
| 8,622,165 | B2 | 1/2014 | Oettinger | | |
| 8,825,244 | B2 | 9/2014 | Rieling et al. | | |
| 2014/0046488 | A1 | 2/2014 | Eul et al. | | |
| 2015/0088404 | A1 | 3/2015 | Geissenhoener | | |

FOREIGN PATENT DOCUMENTS

| | | | |
|---|---|---|---|
| DE | 102012007836 | A1 | 10/2013 |
| EP | 2407705 | A1 | 1/2012 |
| EP | 2679431 | A1 | 1/2014 |
| JP | 04231505 | A | 8/1992 |
| JP | 2010269286 | A | 12/2010 |
| JP | 2014037768 | A | 2/2014 |
| JP | 2014166153 | A | 9/2014 |

OTHER PUBLICATIONS

European Search Report Dated Apr. 30, 2015, Application No. 14186847.1-1752, Applicant Joseph Vögele AG, 8 Pages.

\* cited by examiner

ROAD PAVER WITH OPERATING MODULE AND PROCESS TO ACTIVATE AN OPERATING FUNCTION

CROSS-REFERENCE TO RELATED APPLICATIONS

This application claims foreign priority benefits under 35 U.S.C. §119(a)-(d) to European patent application number EP 14 186 847.1 filed Sep. 29, 2014, which is incorporated by reference in its entirety.

TECHNICAL FIELD

The disclosure relates to a road paver with an operating module, and to a process to activate at least one operating function of a road paver.

BACKGROUND

It is known that road pavers are equipped with several operating stations that each comprise a large number of contact-related buttons which can be used to activate different operating functions of the road paver. As the operating functions of road pavers have strongly increased over time, the functional buttons in the respective operating stations have multiplied accordingly. The increased number of buttons requires a more skillful handling by the operator.

Moreover, experience has shown that conventional contact-related buttons can be subject to the effects of wear that can deteriorate the operability.

Also, the contact-related pressing of a button that takes a certain time is disadvantageous as the respective operating function is only activated after having pressed the button. Especially the waiting time for a certain operating function increases when a certain button pressing sequence is required by several buttons to start the desired operating function. To provide the operator quickly with operating functions, a contact-related pressing of buttons to activate the respective operating functions has often proven to be not satisfactory.

EP 2 407 705 B1 discloses a road paver with a presence detection system. The presence detection system is configured to interrupt the operating functions of the road paver when the operator of the road paver is not on the road paver at a predetermined distance to the operating panel.

SUMMARY

The disclosure is based on the purpose of improving a road paver as well as a process by means of simple constructive characteristics so that it can be used to activate operating functions of the road paver within a short time.

Operating functions that may be, according to the disclosure, quickly operational and accessible, can for example include functions of the paving screed, especially functions that are related to its leveling, heating of this paving screed and/or compression by this paving screed, functions of the material hopper and/or functions of the material conveyor system of the road paver. In particular, these functions are functions of the road paver whose operation presupposes a running engine of the road paver.

According to the disclosure, the road paver is equipped with a sensor unit that is configured to detect a distance of an operator to an operating module, that determines a distance of the operating module to any body part of the operator, whereby the sensor unit is connected to a control unit of the road paver, that is designed to already activate at least one of the operating functions of the road paver by means of an output signal as soon as the operator undercuts a predefined threshold distance in relation to the operating module. Hence, the activation of at least one operating function can occur in a contactless way, i.e., based on a distance measurement, in case of the disclosure. If the operator is positioned within a predefined distance to the operating module, at least one predefined operating function can be activated automatically whereby further, especially other operating functions of the paver that are functionally connected to it, can consequently be activated faster.

The distance is preferably defined as the shortest distance between the sensor unit and any body part of the operator. During operation, the hands and/or fingers of the operator are most likely coming closest to the sensor unit.

In particular, it is possible through the disclosure that a basic operating function, which should generally be activated for normal operation and/or for a defined mode of the road paver, for example starting of the engine of the road paver, pre-heating of the paving screed, pre-heating of the hydraulic system and/or another basic functional setting of the paver can be activated automatically by means of undercutting the threshold distance in relation to the operating module without additional button pressing by the operator. This ensures that the road paver can be commissioned correctly and faster, especially for the construction of a new road surface.

The principle of the disclosure, whereby certain operating functions can be activated in a contactless way, also from a certain distance to the operating module, also enables to operator to activate operating functions beyond his reach for whose activation he formerly had to leave his position in order to press a button.

In particular, the principle of the disclosure has proven to be advantageous in connection with an operating module that is arranged in an operator cabin and/or on a paving screed of the road paver. In case of the latter, the operator can, thanks to the principle of the disclosure, walk alongside the paving screed at a certain distance to the operating module and maintain a predefined safety distance to the paving screed whereby he is still enabled to activate different operating functions even if he cannot reach up to the operating module with his hand.

The principle of contactless activation of operating functions according to the disclosure was described above in connection with a road paver while it can also applied in a beneficial way in other self-propelled construction machines such as feeders.

The operating module preferably comprises a start/stop button that is designed to start and/or to stop the diesel engine of the road paver. As an alternative or in addition to commissioning of the engine by means of pressing the button, a control unit can be configured to generate a start signal to start the diesel engine as soon as the operator undercuts the predefined threshold distance in relation to the operating module, especially in relation to the start/stop button. Thereby, the engine could be started especially fast and easily. This would also have the positive effect of other operating functions, which presuppose a running engine, being faster to activate as no button would previously have to be pressed anymore to start the engine.

Further, and according to a variant of the disclosure, the control unit is possibly configured to automatically generate at least one output signal during the start of the engine in order to set other operating functions, preferably simultaneously, to a status of operational readiness so that the operator does not have to activate them himself anymore. This can include, in particular, the basic operating functions mentioned above. Hence, multiple operating functions could be set to a status of operational readiness following the start of the engine so that the work with the road paver could start even more quickly.

Another advantage consists in the control unit being configured in a way as to generate at least one output signal with a time lag during the start of the engine, which is used to set a further operating function of the road paver to a status of operational readiness so that the operator does not need to activate it himself anymore. This is particularly useful for (basic) operating functions that require a certain lead time, i.e., a warm-up of the engine, before they are activated themselves. These can in particular be hydraulically actuated units of the road paver.

In another preferred design variant of the disclosure, at least a first operating function, that can be activated by means of a contact-related button and/or in a contactless way, requires a temporally preceding activation of at least one second operating function whereby the activation of the second operating function is done in relation to the contact by means of a button and/or in a contactless way whilst the operator undercuts the threshold distance with regard to the operating module. In this design variant, it can for example be possible for the operator to undercut the threshold distance to the operating module, especially in relation to one of the buttons that is functionally associated to the second operating function, with his left hand in order to activate the second operating function whilst he performs a setting of the first operating function simultaneously or with a certain time lag with his right hand.

It is also advantageous if the operating module comprises a signal unit, especially an acoustic or visual signal unit that can tell the operator whether he has activated one or several of the operating functions in a contactless way. The signal unit is preferably designed to display the state of the operating function to the operator by means of a signal, for example by means of a flashing light and or a defined sound signal, i.e., as of when the operating function is fully operational and/or whether the operating function has been activated.

In a particularly advantageous variant, the sensor unit is integrated in the operating module of the road paver. This enables a particularly exact control of whether the operator undercuts the predetermined threshold distance in relation to the operating module. In addition, the sensor unit is well protected within the operating module.

Also, the control unit is possibly integrated in the operating module. Another possibility would be an arrangement of the sensor unit at a different place than the control unit, however, preferably within the operator cabin of the road paver, at a distance to the operator, whereby, based on this distance measurement that is especially vectorial, a distance to the operating module can be derived in order to decide whether the operator undercuts the threshold distance. For example, the sensor unit could be fastened on the bottom of the operator cabin roof from where the operator can be well detected below that roof and in front of the operating module.

It is also useful to equip the sensor unit with at least one sensor that is configured to detect the distance of the operator to the operating module. Also, it would be possible for the sensor unit to comprise several sensors that are designed in a way as to capture a three-dimensional space around the operating module so that an approximation of the operator towards the operating module from different directions can be detected.

In a further preferred variant of the disclosure, the sensor is a first sensor that is arranged, in relation to a first operating function, closer to a first button through which the first operating function can be activated than to a second button through which a second operating function can be activated. The first sensor is therefore located in immediate proximity to the button through which also a contact-based activation of the respective operating function can be performed. Hence, the operator is aware which button he needs to approach in order to undercut the predetermined threshold distance in relation to this button in order to activate the respective operating function.

The contactless activation of the first operating function works with particular accuracy when the sensor is integrated fittingly in the first button. Hence, it is clear for the operator which button he needs to approach with his hand to activate the operating function that is functionally coupled with this button in a contactless way.

Particularly useful for the disclosure is a sensor that is an infrared sensor, an inductive sensor, a capacitive sensor, a radar sensor or an ultrasound sensor. These sensors enable a reliable contactless detection of the distance to the operator.

It can be advantageous from a safety-relevant perspective if some of the operating functions presuppose a contact-based, temporally preceding button pressing of another button so that they can be activated, i.e., if they require a general release switch. This can prevent the accidental activation of operating functions while the operator is not close to the road paver.

A particular advantage consists in the predefined threshold distance being adjustable by means of the control unit. Therefore, the sensitivity of the activation of the respective operating function can be adjusted. Depending on where the operating module is located on the road paver, a reduction and/or increase of the predetermined threshold distance can be beneficial. For example, an increase of the predetermined threshold distance can be advantageous in relation to an operating module which is fastened on its paving screed so that the operator walking alongside the paving screed does not come too close to the working space of the paving screed in order to activate one or another operating function of the operating module. From the operating cabin of the road paver, a reduction of the predetermined threshold distance can be advantageous so that accidental activation of operating functions is prevented.

The previously mentioned variants of the disclosure mostly refer to the contactless activation of operating functions of a road paver. According to the disclosure, operating functions of the road paver can of course also be deactivated in a contactless way, which occurs for example by means of undercutting the threshold value by the operator after activating the operating function. Equally, deactivation of at least one further operating function can possibly also be triggered by the simultaneous or delayed deactivation of a defined operating function. Alternatively, operating functions that have been activated in a contactless way can possibly be deactivated separately or jointly by means of pressing a button. In particular, the control unit is configured to switch off all operating functions when the engine of the road paver is turned off.

It is also useful to equip the operating module with at least one mode button, that can be activated in a contactless way, for the operation of the road paver such as for the modes installation drive, movement and/or transportation whereby the control unit is designed to automatically activate and/or deactivate a predetermined number of operating functions, that are typical for the mode, through activation of the mode button when the threshold distance in relation to the mode button is undercut.

The disclosure also relates to a process for contactless activation of at least one operating function of a road paver. Therefore, a distance between an operating module of the road paver and an operator is first measured by means of a sensor unit of the road paver. The distance thereby determines a space from the operating module to any body part of the operator. Subsequently, the measured distance is evaluated by means of a control unit of the road paver in relation to a predetermined threshold distance. If this evaluation shows that the measured distance undercuts the predetermined threshold distance, at least one operating function of the road paver will be activated automatically.

This way of contactless activation of operating functions of the road paver leads to a shortened activation time of a respective operating function while the disadvantages from the state of the art, described above in connection with contact-related button pressing, can be avoided.

At least a first one of the operating functions is preferably activated automatically when preceded by an activation of at least a second operating function, for example switching on a drive, especially of the diesel engine of the road paver, whereby the second operating function is activated in a contactless way when the operator undercuts the threshold distance in relation to the operating module. Hence, the activation of an operating function, that presupposes the activation of another operating function at first, occurs faster and is therefore at the operator's disposal within a short time.

It is especially advantageous if the second operating function, that is activated in a contactless way, is the starting process of a diesel engine of the road paver. In particular, this leads to other (basic) operating functions being switched on simultaneously or with a time lag.

By means of this process, the structural characteristics mentioned previously in connection with the road paver can be implemented on the basis of analogous process engineering characteristics, which is why a detailed description of such characteristics is not provided at this point.

Embodiments according to the present disclosure are described with reference to the attached drawings.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
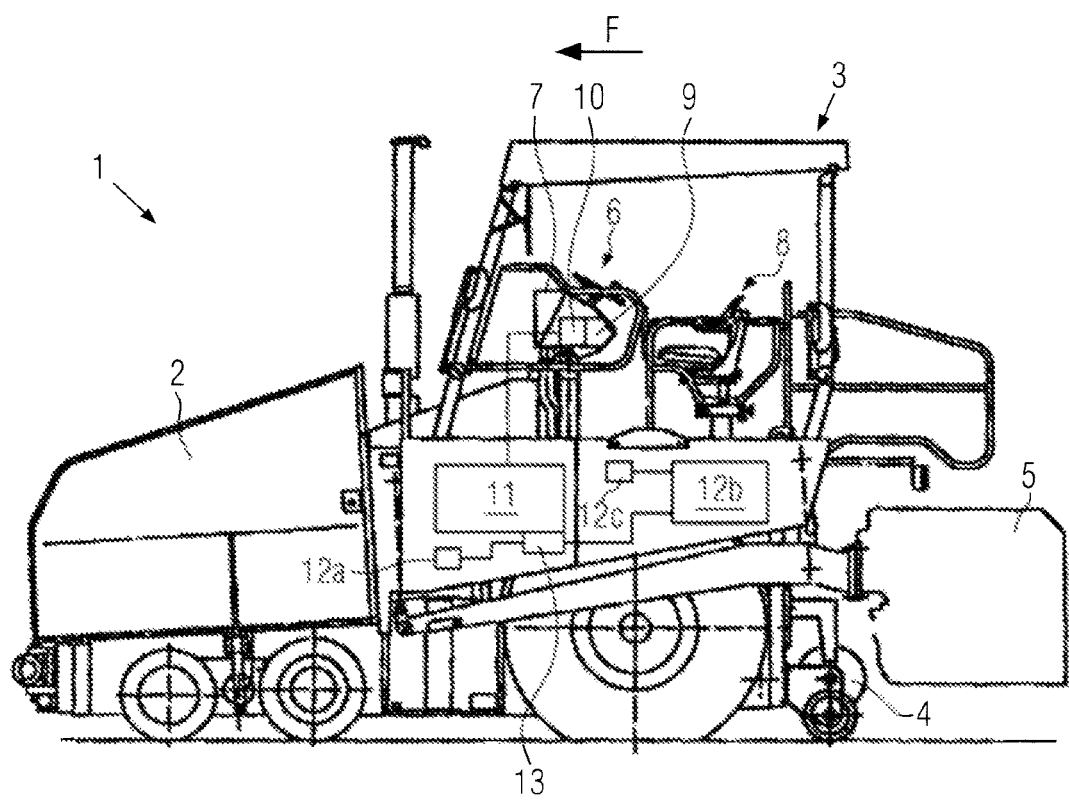
FIG. 1 is a road paver with an operating module that is designed for contactless activation of an operating function.

FIG. 1 shows a road paver 1 to produce a road surface. The road paver is, from a left-to-right perspective in the direction of travel F, equipped with a material hopper 2, an operator cabin 3, a transversal distributor 4 as well as a paving screed 5. From the material hopper 2, surfacing material is supplied to the transversal distributor 4 by means of a conveyor system that is not shown, which spreads the surfacing material in front of the paving screed by which the surfacing material is finally compressed.

The operator cabin 3 of the road paver 1 comprises an operating station 6 with an operating module 7. Next to the operating station 6, there is a seat 8 on which an operator can sit down and coordinate different operating functions of the road paver 1 by means of the operating module 7. FIG. 1 further shows a sensor unit 9 that is installed in the operating module 7. The sensor unit 9 is configured to detect an approximation of the operator towards the operating module 7 while the operator is in the operator cabin 3. In the operating module 7, a control unit 10 is installed besides the sensor unit 9. The control unit 10 is functionally connected to the sensor unit 9, whereby it is designed to automatically generate an operating command to activate an operating function when an approximation of the operator towards to operating module 7 is detected by means of the sensor direction.

FIG. 1 further provides a schematic display of a drive 11 of the road paver 1. The drive 11 can be designed as a diesel engine. The drive 11 is functionally connected to several work units 12a, 12b, 12c that are designed to perform specific operating functions on the road paver 1 as a function of the operation of the drive 11. A power transmission from the drive 11 to the respective work units 12a, 12b, 12c can occur through a power distributor 13 according to FIG. 1, which is designed for example as a transfer case. Although there is a direct functional connection between the work units 12a, 12b, 12c according to FIG. 1 and the drive 11, the work units 12a, 12b, 12c can also be uncoupled from the drive 11 whereby at least some of them can be activated automatically by means of the control unit 11 as a function of the status/modus of the drive 11.

FIG. 1 further shows that the control unit 10 installed in the operating module 7 is connected to the drive 11 of the road paver 1. The control unit 10 is configured to activate the operation of the drive 11 of the road paver 1 as a function of a positioning of the operator in the operator cabin 3 in relation to the operating module 7, whereby especially the starting process of the drive 11 is automatically initiated by the control unit 10 when there is a predetermined approximation of the operator towards the operating module 7. Additional, contact-based button pressing is thereby not necessary to start the drive 11.

The work units 12a, 12b, 12c can especially coordinate operating functions of the material hopper 2, the transversal distributor 4 and a hydraulic system of the road paver 1, which is not shown, and/or of the paving screed 5.

Figure 2:
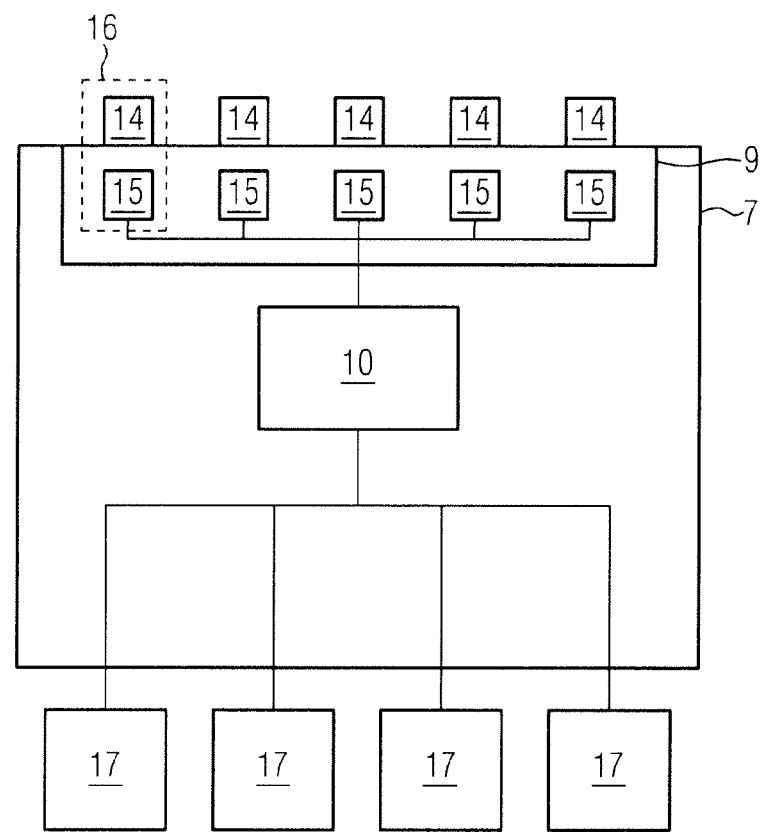
FIG. 2 is a schematic display of an operating module according to the disclosure which is configured for contactless activation of several operating functions.

FIG. 2 shows a schematic display of the operating module 7 from FIG. 1. The operating module 7 comprises a variety of buttons 14 that can be operated through button pressing to enter an operating command in order to activate different operating functions of the road paver 1. Below the buttons 14, there is the sensor unit 9 in the operating module 7. The sensor unit 9 comprises a variety of sensors 15. According to FIG. 2, the buttons 14 together with the sensors 15 form the respective activation units 16. The respective activation units 16 are configured in a way as to transmit operating commands to the control unit, either in a contact-based way by means of button pressing or in a contactless manner through the sensors 15, to activate relevant operating functions of the road paver 1. Hence, operating commands can be entered through the activation units 16 by means of pressing the buttons 14 or in a contactless way through detection by the sensors 15 when the operator, i.e., any body part of the operator, approaches the operating module 7, especially a respective button 14.

Operating commands, that are transmitted to the control unit 10 by the buttons 14 and/or the sensors 15, are used by the control unit 10 to activate relevant operating functions of the road paver 1. In FIG. 2, the control unit 10 continues to be functionally connected to the working components 17. The working components 17 perform different operating functions of the road paver 1. One of the working components 17 can for example be the drive 11 from FIG. 1. According to FIG. 2, the drive 11 could then be coordinated by means of one of the activation units 16 in a contact-based way through button pressing and/or in a contactless manner through approximation of the respective sensor 15 with a body part of the operator.

Figure 3:
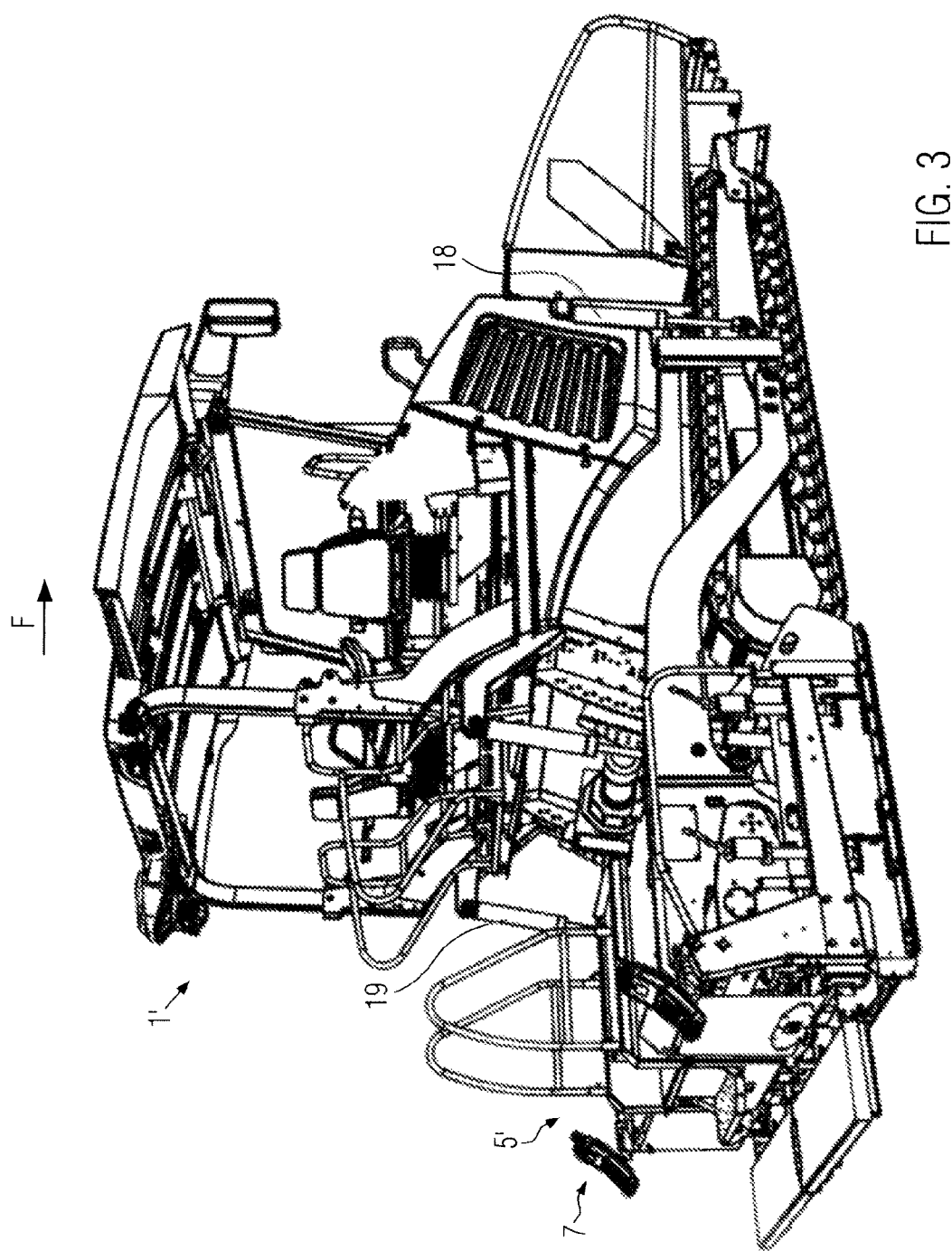
FIG. 3 is a road paver according to a design variant in which the operating module according to the disclosure is fastened on the paving screed of the road paver.

FIG. 3 shows a road paver 1' that has essentially the same structure as the road paver 1 from FIG. 1. In addition to the road paver 1 from FIG. 1, the road paver 1' from FIG. 3 comprises two operating modules 7' which are fastened on the paving screed 5'. Although two operating modules 7' are shown in this variant, there may only be one operating module 7' attached to the paving screed 5'. The operating modules 7' are configured to coordinate the operation of the paving screed 5', especially to set heating, compression, vibration and/or leveling parameters of the paving screed. For example, leveling cylinders 18 as well as lifting cylinders 19 can be controlled by means of the operating modules 7' in order to coordinate a movement of the paving screed 5'.

The inventive principle that was described based on the FIGS. 1 and 2 in connection with a contactless activation of operating commands can also be applied in the operating modules 7' of FIG. 3. The operating modules 7' can therefore be controlled both through button pressing as well as in a contactless way in order to activate operating functions of the paving screed 5'.

Figure 4:
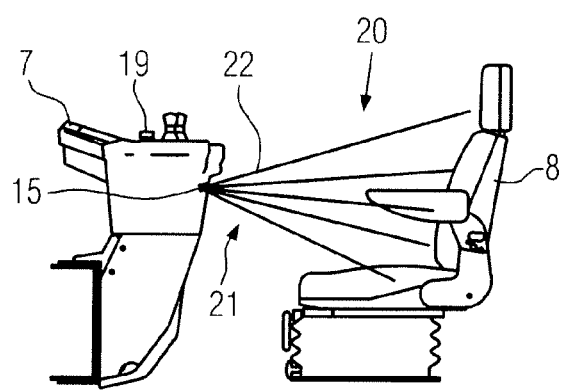
FIG. 4 is an enlarged display of the operating mode according to the disclosure in relation to a seat of the road paver.

FIG. 4 shows an enlarged view of the operating module 7 from FIG. 1 in relation to the seat 8 of the operator cabin 3. The operating module 7 comprises a start/stop button 19 by means of which the drive 11 can be started as well as switched off in a contact-based way. FIG. 4 further shows that one of the sensors 15 from FIG. 2 is arranged in the operating module 7 in a way that it monitors a space 20 between the operating module 7 and the seat 8. Besides the operating module 7, the space 20 has a partial space 21 that is defined by a threshold distance 22. Undercutting the threshold distance 22 with any body part of the operator, be it for example the hand or the leg, triggers a start/stop operating command of the drive 11, which can alternatively also be triggered in a contact-based way through button pressing of the start/stop button 19. In FIG. 4, the sensor 15 is arranged on a side of the operating module 7 that faces the operator while the sensor 15 can also be located more closely to the start/stop button 19 and/or be wholly integrated in the latter in order to detect an undercut of the threshold distance 22 only when the operator's hand reaches in the direction of the start/stop button 19. This approximation detection can be applied to all operating buttons of the operating module 7.

The principle of contactless activation of operating functions according to the disclosure is excellent to use in all operating modules of a road paver in order to activate operating functions of the road paver in an advantageous way.

As one skilled in the art would understand, the above described operating module(s), sensor unit and control unit may each comprise any suitable hardware and/or software for performing the recited functions and/or operations. For example, the operating module(s), sensor unit and control unit may each include, or together include, one or more processors (e.g., microprocessors, microcontrollers, and/or programmable digital signal processors). Alternatively, or in addition, the above components may each include, or together include, one or more application specific integrated circuits, programmable gate arrays, programmable logic devices and/or digital signal processors. Where a particular component includes one or more programmable devices such as microprocessors, microcontrollers or programmable digital signal processors, the component may further include a memory or storage for storing computer executable instructions that are executable by the one or more programmable devices to control or perform the particular algorithms represented by the functions and/or operations described herein.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A road paver comprising:
   an operating module for entering operating commands, the operating module having a plurality of buttons that can each be used in a contact-related way to enter the respective operating commands in order to activate relevant operating functions of the road paver;
   a sensor unit designed to detect a distance of an operator to the operating module, wherein the distance determines a space from the operating module to any body part of the operator; and
   a control unit connected to the sensor unit and configured to activate at least one of the operating functions of the road paver as soon as the operator undercuts a predetermined threshold distance in relation to the operating module.

2. The road paver according to claim 1 wherein the operating module comprises a start/stop button that is designed for starting and/or stopping of a diesel engine of the road paver, and wherein the control unit is designed to generate a start signal to start the diesel engine as soon as the operator undercuts the predetermined threshold distance in relation to the operating module.

3. The road paver according to claim 1 wherein at least a first one of the operating functions presupposes a temporally preceding activation of at least a second operating function, whereby the activation of the second operating function occurs in a contactless way as the operator undercuts the threshold distance in relation to the operating module.

4. The road paver according to claim 1 wherein the sensor unit is installed in the operating module of the road paver.

5. The road paver according to claim 1 wherein the sensor unit has at least one sensor that is configured to detect the distance of the operator to the operating module.

6. The road paver according to claim 5 wherein the at least one sensor comprises a first sensor that is arranged, in relation to a first operating function, closer to a first button through which the first operating function can be activated than to a second button through which a second operating function can be activated.

7. The road paver according to claim 6 wherein the first sensor is integrated in the first button.

8. The road paver according to claim 5 wherein the at least one sensor comprises an infrared sensor, an inductive sensor, a capacitive sensor, a radar sensor or an ultrasound sensor.

9. The road paver according to claim 1 wherein some of the operating commands presuppose a contact-based, temporally preceding pressing of another button in order to activate a respective operating function.

10. A process to activate at least one operating function of a road paver, the process comprising:
measuring a distance between an operating module of the road paver and an operator by a sensor unit of the road paver, whereby the distance determines a space from the operating module to any body part of the operator;
evaluating the measured distance by a control unit of the road paver in relation to a predetermined threshold distance; and
automatically activating at least one operating function of the road paver when the measured distance undercuts the predetermined threshold distance.

11. The process according to claim 10 wherein at least a first one of a plurality of operating functions of the road paver is activated if preceded by an activation of at least one second operating function, and wherein the at least one second operating function is activated in a contactless way as the operator undercuts the threshold distance in relation to the operating module.

12. The process according to claim 11 wherein the at least one second operating function, which is activated in a contactless way, comprises starting of a diesel engine of the road paver.

13. A road paver comprising:
an operating module for entering operating commands, the operating module having a plurality of buttons that can be used in a contact-related way to enter respective operating commands in order to activate relevant operating functions of the road paver;
a sensor unit designed to detect a distance of an operator to the operating module; and
a control unit associated with the sensor unit and configured to activate at least one of the operating functions of the road paver when the detected distance is less than a predetermined threshold distance.

14. The road paver according to claim 13 further comprising an engine, wherein the operating module comprises a start/stop button that is designed for starting and/or stopping of the engine, and wherein the control unit is designed to generate a start signal to start the engine when the detected distance is less than the predetermined threshold distance.

15. The road paver according to claim 13 wherein at least a first one of the operating functions presupposes a temporally preceding activation of at least a second operating function, and wherein the activation of the second operating function is designed to occur in a contactless way when the detected distance is less than the threshold distance.

16. The road paver according to claim 13 wherein the sensor unit is installed in the operating module of the road paver.

17. The road paver according to claim 13 wherein the sensor unit includes at least one sensor that is configured to detect the distance of the operator to the operating module.

18. The road paver according to claim 17 wherein the at least one sensor comprises a first sensor that is arranged, in relation to a first operating function, closer to a first button through which the first operating function can be activated than to a second button through which a second operating function can be activated.

19. The road paver according to claim 18 wherein the first sensor is integrated in the first button.

20. The road paver according to claim 17 wherein the at least one sensor comprises an infrared sensor, an inductive sensor, a capacitive sensor, a radar sensor or an ultrasound sensor.

* * * * *